(12) United States Patent
Okajima

(10) Patent No.: US 6,588,853 B2
(45) Date of Patent: Jul. 8, 2003

(54) BICYCLE RIM

(75) Inventor: Shinpei Okajima, Izumi (JP)

(73) Assignee: Shimano Inc., Osaka (JP)

(*) Notice: Subject to any disclaimer, the term of this patent is extended or adjusted under 35 U.S.C. 154(b) by 106 days.

(21) Appl. No.: 09/995,784

(22) Filed: Nov. 29, 2001

(65) Prior Publication Data

US 2003/0098608 A1 May 29, 2003

(51) Int. Cl.[7] .............................. B60B 1/04; B60B 1/00
(52) U.S. Cl. ................. 301/58; 301/55; 301/95.101; 29/894.33
(58) Field of Search ................ 301/55, 58, 95.101, 301/54, 104; 29/894.33, 894.331, 894.332, 894.333

(56) References Cited

U.S. PATENT DOCUMENTS

| | | | |
|---|---|---|---|
| 648,610 A | * 5/1900 | French | |
| 773,465 A | * 10/1904 | Borg | |
| 5,228,756 A | * 7/1993 | Krampera | 301/58 |
| 6,126,243 A | * 10/2000 | Okajima et al. | 301/58 |
| 6,234,580 B1 | 5/2001 | Muraoka et al. | |
| 6,283,557 B1 | * 9/2001 | Okajima et al. | 301/58 |
| 6,354,668 B2 | 3/2002 | Okajima et al. | |
| 6,382,734 B1 | * 5/2002 | Passarotto | 301/55 |

* cited by examiner

Primary Examiner—Russell D. Stormer
(74) Attorney, Agent, or Firm—Shinjyu Global IP Counselors, LLP

(57) ABSTRACT

A bicycle rim includes side portions with an outer portion extending between the side portions to form a pair of outer corners, and a spoke attachment portion. The outer portion includes a pair of ridges spaced from the outer corners. The ridges preferably divide a pair of inclined surfaces. The side portions preferably include a pair of ground braking surfaces with a pair of sloping surfaces extending from the braking surfaces to a pair of outer side surfaces.

22 Claims, 16 Drawing Sheets

BICYCLE RIM

BACKGROUND OF THE INVENTION

1. Field of the Invention

This invention generally relates to a bicycle rim for a bicycle wheel. More specifically, the present invention relates to a bicycle rim, which is configured to improve the roundness of the bicycle wheel when the spokes are placed under tension between the rim and the hub.

2. Background Information

Bicycling is becoming an increasingly more popular form of recreation as well as a means of transportation. Moreover, bicycling has also become a very popular competitive sport for both amateurs and professionals. Whether the bicycle is used for recreation, transportation or competition, the bicycle industry is constantly improving the various components of the bicycle. One particular component of bicycles, which has been extensively redesigned over the past years, is the bicycle wheel. Bicycle wheels are constantly being redesigned to be lightweight and more aerodynamic in design as well as to be simple to manufacture and assemble.

There are many different types of bicycle wheels, which are currently available on the market. Most bicycle wheels have a hub portion, a plurality of spokes and an annular rim. The hub portion is attached to a part of the frame of the bicycle for relative rotation. The inner ends of the spokes are coupled to the hub and extend outwardly from the hub to the rim. The annular rim is coupled to the outer ends of the spokes and has an outer portion for supporting a pneumatic tire thereon. Typically, the spokes of the bicycle wheel are thin metal wire spokes that are placed under tension. Each end of the hub is provided with a flange that is used to couple the spokes to the hub. In particular, holes are provided in the hub flanges. The wire spokes are usually bent on their inner end and provided with a flange that is formed in the shape of a nail head. The inner ends are supported in the holes in the hub flanges. The outer ends of the spokes typically are provided with threads for engaging spoke nipples, which secure the outer ends of the wire spokes to the rim. In particular, the spoke nipples have flanges, which engage the interior surface of the rim. Alternatively, the spokes may be reversed, with the outer end having the nail head and the inner end having the threads for engaging the spoke nipples, which secure the inner ends of the wire spokes to the hub.

Typically, conventional spokes are attached to either the inner edge or the lateral side portions of the rim. Thus, the amount of force that can be applied to the rim by the spokes depends mainly upon the thickness of the inner edge of the rim or the lateral side portions of a rim. In order to accommodate the stress from the spokes, the inner edge of the rim can be made thicker. However, making the rim thicker increases the weight of the rim.

In recent years, wheels have been designed with reinforcing members arranged on the outer ends of the spokes to aid in disbursing the stress concentrated on portions of the rim. Such a wheel is disclosed in Shimano's U.S. Pat. No. 6,126,243. This wheel (i.e., rim, and spoke combination) is very strong, lightweight, and relatively simple and inexpensive to manufacture.

Generally speaking, the spokes in the bicycle wheel must be applied with a certain amount of tension in order to provide rigidity and trueness to the wheel. In conventional style wheels with thirty-two or more spokes, the tension applied on any one spoke is not very great. Moreover, the spokes pull the rim relatively evenly because the spoke attachment holes in the rim are fairly close together.

However it is desirable in the bicycle industry to have as few spokes as possible. One problem with reducing the number of spokes is the concentrated stress applied to the rim. In other words, if fewer spokes are used, the stress on the rim by each spoke becomes increasingly larger. Therefore, the spokes in the wheel with fewer number of spokes pull the rim with greater force at each attachment point. This typically causes greater deformation of the rim at the spoke attachment points than the remaining sections of the rim. Thus, the wheel after being assembled may not be truly round. In other words, the outer peripheral edge of the rim can be deformed into a somewhat polygonal shape. For example, bicycle wheels have been produced with sixteen spoke attachment portions with a pair of spoke attachment portions being positioned very close to each other. When tension is applied to the spokes, the rim is deformed from a substantially perfectly round shape to a polygonal shape after assembly of the wheel.

In view of the above, there exists a need for a bicycle rim that overcomes the above-mentioned problems in the prior art. This invention addresses this need in the prior art as well as other needs, which will become apparent to those skilled in the art from this disclosure.

SUMMARY OF THE INVENTION

One object of the present invention is to provide a rim in which tensioning of the spokes produces a bicycle wheel with improved the roundness.

Another object of the present invention is to provide a rim that can be manufactured without substantially increasing the cost of manufacture.

Yet another object of the present invention is to provide a rim that can be utilized with a low number of spokes.

The foregoing objects can basically be attained by providing a bicycle rim that comprises first and second annular side portions, an inner annular portion, an outer annular tire attachment portion and a plurality of circumferentially spaced spoke openings. The inner annular portion is disposed radially inwardly of the first and second annular side portions and disposed axially between the first and second annular side portions. The outer annular tire attachment portion is disposed axially between the first and second annular side portions. The tire attachment portion has non-circular outer peripheral edges arranged about a center axis of the rim. The circumferentially spaced spoke openings are formed in at least one of the following: the inner annular portion or the first and second annular side portions. The non-circular outer peripheral edges have first radii extending from the center axis of the rim and passing through the spoke openings that are larger than second radii of the non-circular outer peripheral edges passing midway between selected circumferentially adjacent pairs of the spoke openings.

The foregoing objects can also basically be attained by a method of forming a bicycle wheel comprising the steps of: forming a non-circular bicycle rim having a non-circular outer periphery arranged about a center axis of the rim; attaching a bicycle hub to the non-circular bicycle rim by a plurality tension spokes; and tightening the tension spokes to place the tension spokes under tension and deform the rim inwardly in a generally radial direction to become more circular.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Figure 1:
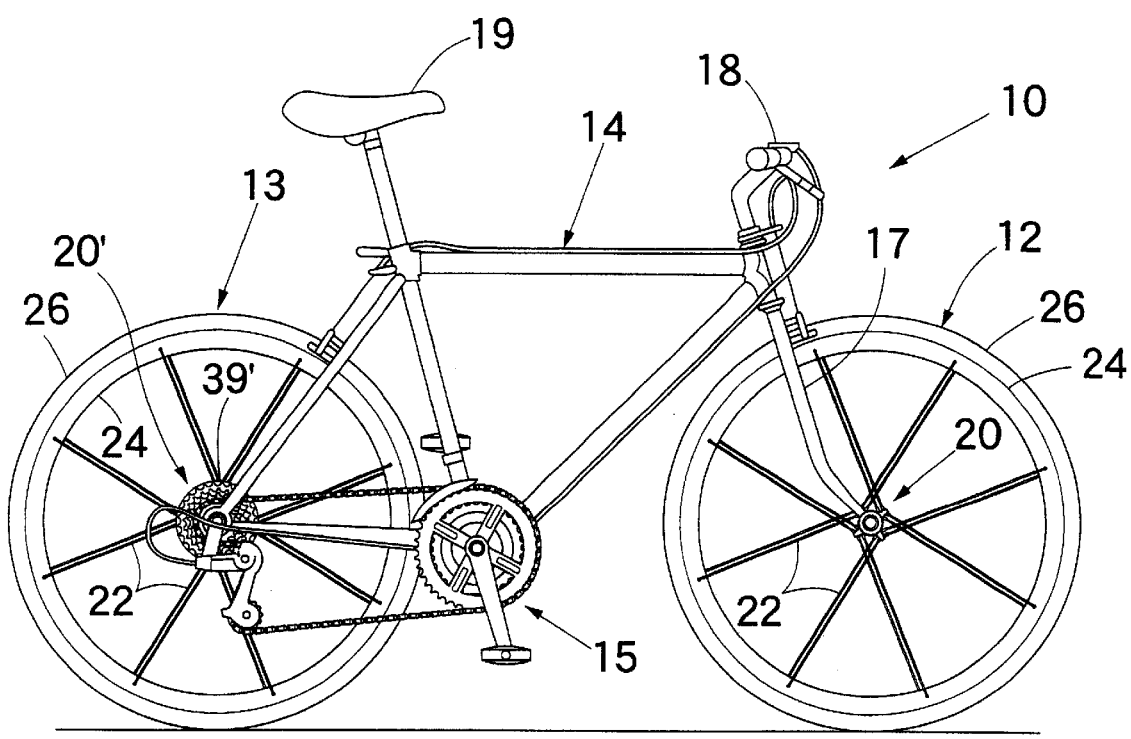
FIG. 1 is a side elevational view of a bicycle having front and rear wheels in accordance with the present invention.
Figure 2:
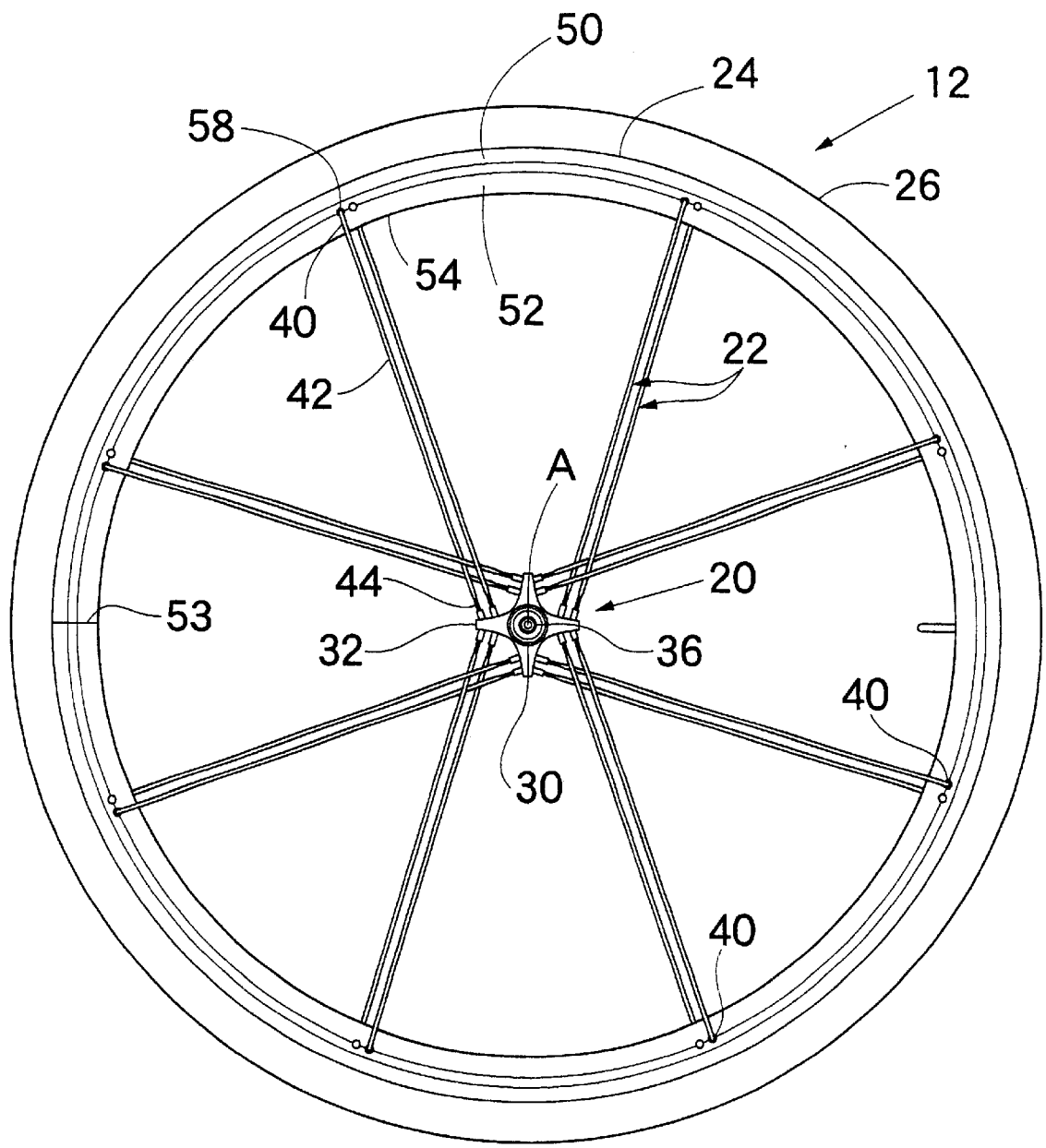
FIG. 2 is a side elevational view of the front bicycle wheel illustrated in FIG. 1 in accordance with the present invention.
Figure 3:
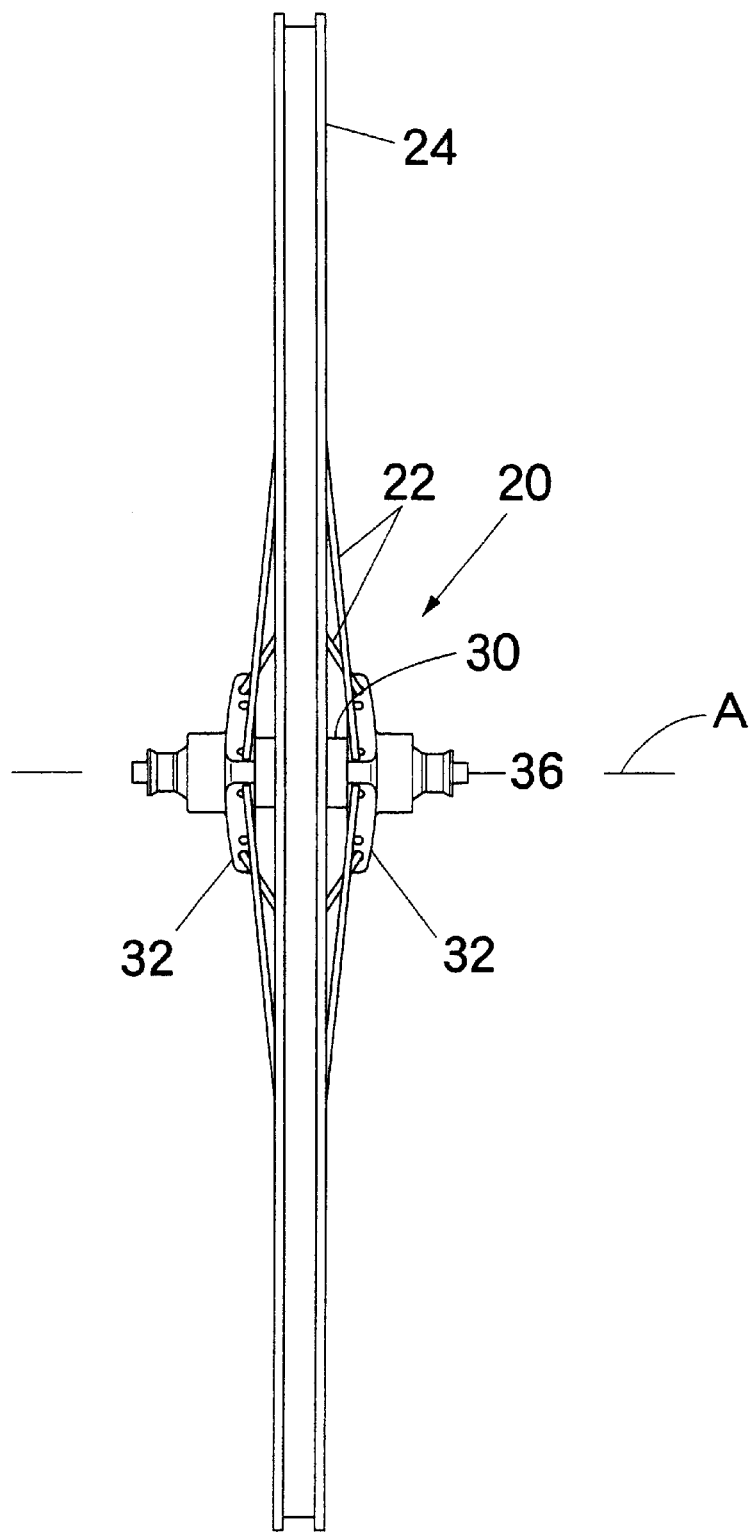
FIG. 3 is an edge elevational view of the front bicycle wheel with the bicycle rim illustrated in FIG. 1 and 2 in accordance with the present invention.
Figure 4:
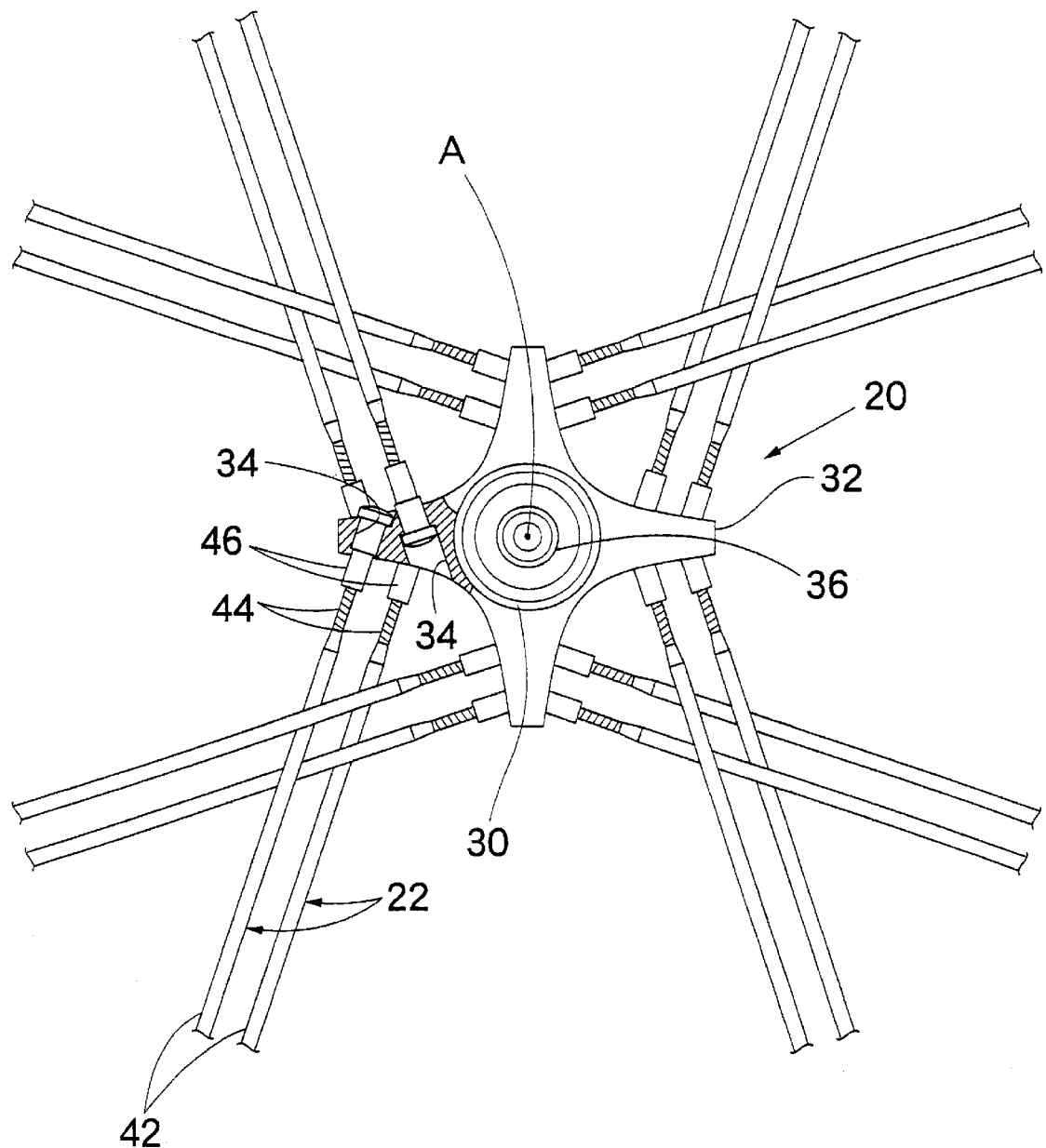
FIG. 4 is an enlarged, partial side elevational view of the bicycle hub assembly used with the bicycle rim illustrated in FIGS. 1–3 in accordance with the present invention, with a portion of the hub body broken away for purposes of illustration.

Referring initially to FIG. 1, a bicycle 10 is illustrated with a pair of bicycle wheels 12 and 13 in accordance with the present invention. The bicycle wheels 12 and 13, as discussed below, are designed such that after assembly, the wheels 12 and 13 are more round than conventional wheels with similar spoking arrangements. The bicycle 10 basically has a frame 14 with front and rear wheels 12 and 13 rotatably coupled thereto. A conventional drive train 15 is operatively coupled the rear wheel 13 for propelling the bicycle 10. A front fork 17 is coupled between the frame 14 and the front wheel 12 in a conventional manner. The front wheel 12 is turned by turning a handlebar 18, which is fixedly coupled to the front fork 17. The rear wheel 13 is rotatably coupled to a rear portion of the frame 14. The frame 14 also has a seat 19 adjustably coupled to frame 14.

Since the parts of the bicycle 10 are well known in the art, the parts of the bicycle 10 will not be discussed or illustrated in detail herein, except as they are modified in accordance with the present invention. Moreover, various conventional bicycle parts such as brakes, derailleurs, additional sprockets, etc., which are not illustrated and/or discussed in detail herein, can be used in conjunction with the present invention.

Turning now to FIGS. 2–8, the front wheel 12 basically includes the front bicycle hub 20, a plurality of outwardly extending spokes 22 and an annular rim 24 with a pneumatic tire 26 coupled thereto in a conventional manner. In the illustrated embodiment, the front wheel 12 has sixteen spokes 22 extending generally in a radial direction between the front hub 20 and the annular rim 24. Of course, it will be apparent to those skilled in the art from this disclosure that the front wheel 12 can have fewer or more spokes 22 than illustrated without departing from the present invention, if needed and/or desired.

Figure 5:
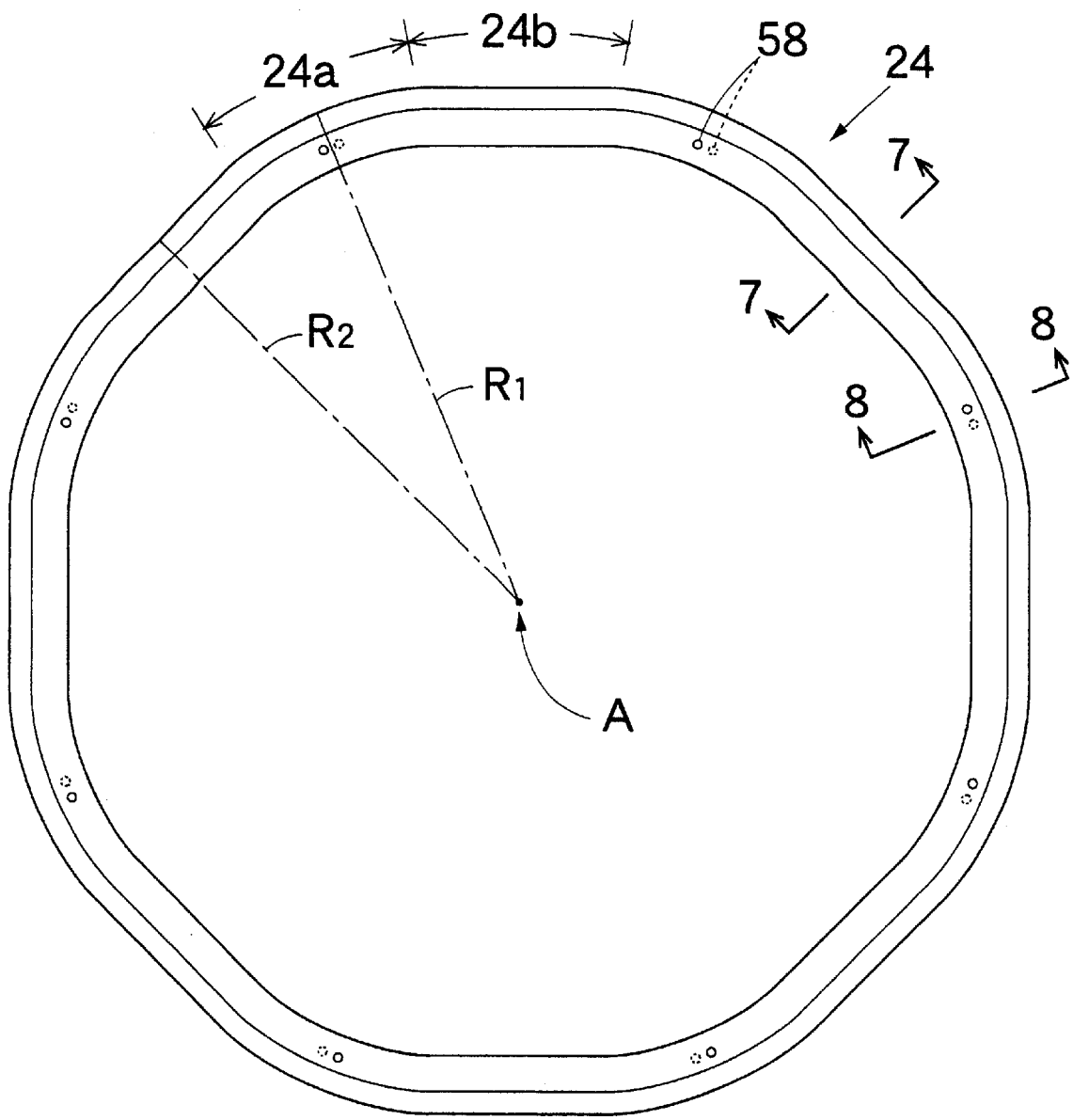
FIG. 5 is an exaggerated side elevational view of the bicycle rim illustrated in FIGS. 1–4 in accordance with the present invention, prior to the tensioning of the spokes to produces the bicycle wheel with improved the roundness.

The rim 24 is constructed of a substantially rigid material, such as those materials, which are well known in the art. For example, the rim 24 can be constructed of any suitable metallic material, such as plated steel, stainless steel, aluminum, magnesium or titanium, as well as other non-metallic materials, such as a carbon fiber composite, which can be utilized for a bicycle wheel. The rim 24 is relatively conventional, except for their shape. As discussed below in more detail, the rim 24 has a generally octagonal shape prior to assembly as seen in FIG. 5. This octagonal shape of the rim 24 is design to improve the roundness of the wheel due to the deformation caused by the spokes 22. Basically, the spokes 22 are under placed under tension during assembly, which in turn causes the rim 24 to deform radially inwardly as explained below in more detail.

Still referring to FIGS. 2–4 and 6–8, the general construction of the front wheel 12 will now be described in more detail to better understand the present invention. The front hub 20 is a well known hub in the art. Thus, the hub 20 will not be discussed or illustrated in detail herein. Moreover, it will be apparent to those skilled in the art that the construction of the hub 20 can be modified from the hub illustrated herein without departing from the scope of the present invention. Moreover, the front hub 20 is designed to have sixteen tangentially arranged spokes 22. However, it will be apparent to those skilled in the art from this disclosure that the hub 20 can be designed for tangential and/or radial spokes with more or fewer spokes as needed and/or desired.

Basically, the front hub 20 has a tubular body 30 with a pair of end mounting flanges 32 for mounting spokes 22 thereto. Each end flange 32 has four spoke attachment points or members with a pair of spoke holes 34 formed in each of the spoke attachment members for coupling the spokes 22 thereto. The tubular body section 30 rotatably supports an axle 36 therein about a center axis of rotation A by a pair of bearing assemblies (not shown). Each of the spoke holes 34 preferably has a step shaped configuration for attaching the spokes 22 thereto.

As mentioned above, the number and shape of the spoke attachment points of the end flanges 32 will depend on the number of spokes and their shapes. Accordingly, it will be apparent to those skilled in the art from this disclosure that other types and shapes of hubs can be utilized in connection with the present invention.

Each of the spokes 22 has an outer end portion 40, a center middle portion 42 and an inner end portion 44. The outer end portions 40 are in the shape of spoke heads that are coupled to the rim 24 by reinforcement members or washers 48. The reinforcement washers 48 are designed to disperse the stress applied to the rim 24 by the spokes 22. Of course, the present invention can be carried out without the use of reinforcement members as illustrated herein, as needed and/or desired.

The straight center portion 42 of each spoke 22 is located radially inwardly of its respective outer end portion 40, and its respective inner end portion 44 is located radially inwardly of its respective center portion 42. The inner end portions 44 are coupled to the front hub 20 utilizing spoke nipples 46 in a conventional manner. Preferably the outer end portion 40, the center portion 42 and the inner end portion 44 are constructed as a unitary, one-piece member with the spoke nipples 46 threadedly coupled to the inner end portion 44 of each of the spokes 22 for connection to the hub 20.

Figure 6:
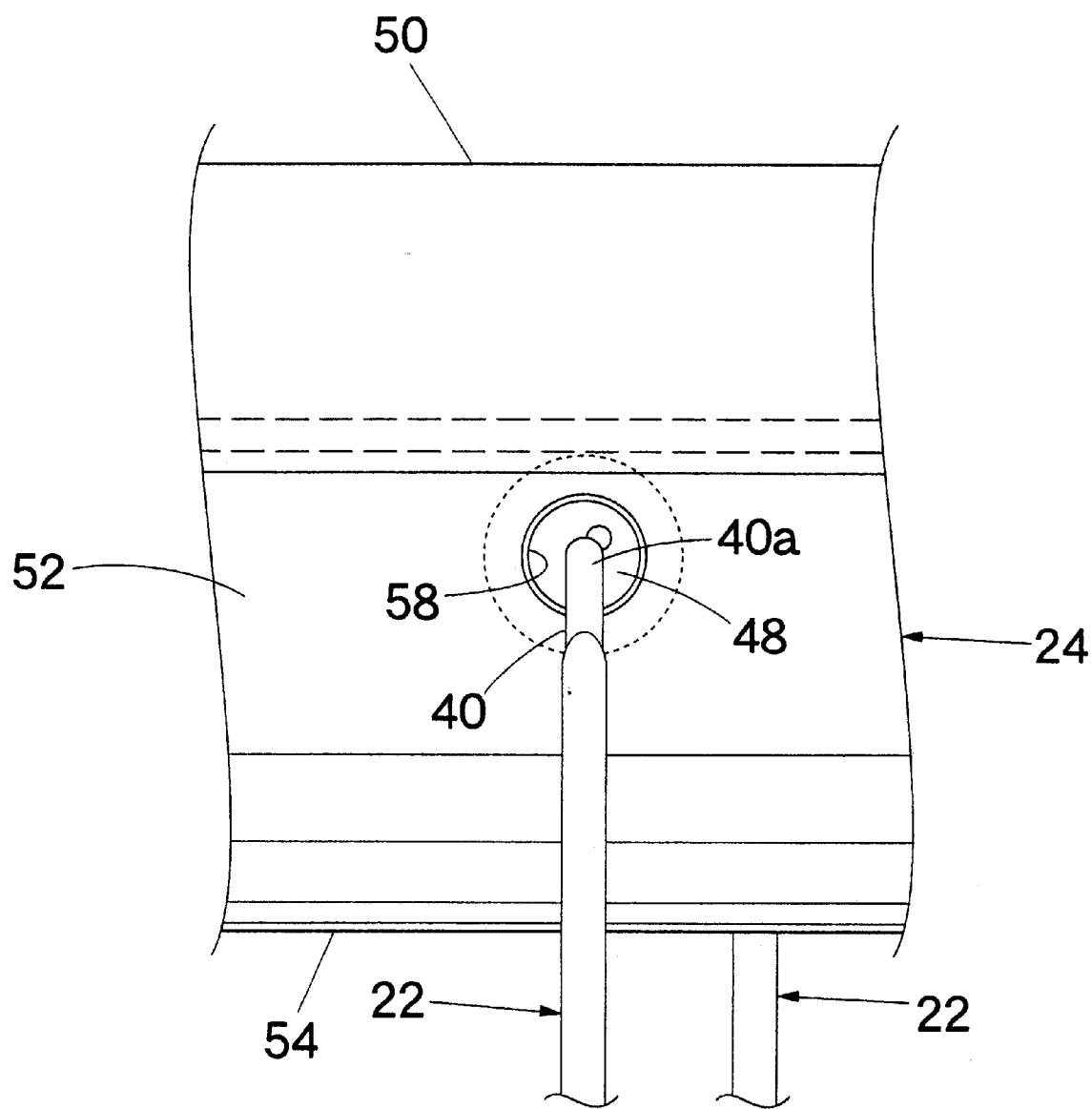
FIG. 6 is an enlarged, partial side elevational view of the bicycle rim illustrated in FIGS. 1–5 in accordance with the present invention, with a pair of spokes coupled thereto.
Figure 8:
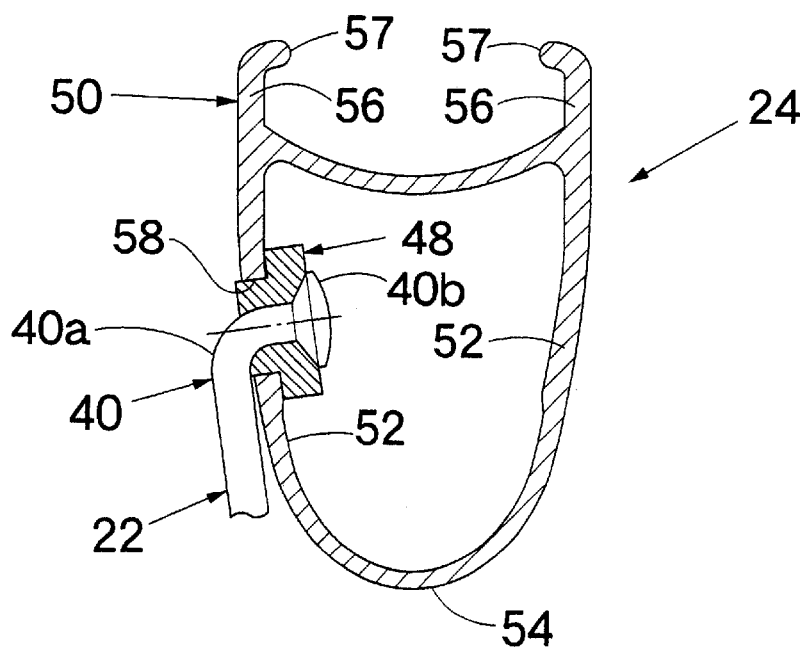
FIG. 8 is a partial, enlarged cross sectional view of the bicycle rim illustrated in FIGS. 1–7 in accordance with the present invention as seen along section line 8—8 of FIG. 5 and with a spoke coupled thereto.

As best seen in FIGS. 6 and 8, the outer end portions 40 of the spokes 22 have a bent section 40a with an enlarged head 40b at the free end of the bent section 40a. The bent section 40a has a circular cross-section of a predetermined diameter or width. The head 40a has a larger diameter or width to secure the spoke 22 to the rim 24 via the reinforcement washer 48. The center portions 42 and the inner end portions 44 each have a circular or elliptical cross-section. Of course, it will be apparent to those skilled in the art from this disclosure that the entire length of the spokes 22 can be substantially uniform along its entire cross-section, if needed and/or desired. It will also be apparent to those skilled in the art that constant cross-section spokes can be utilized or spokes with varying cross-sections can be utilized as needed and/or desired.

Referring again to FIG. 4, the inner end portions 44 of the spokes 22 are threaded for receiving the conventional spoke nipples 46 thereon. More specifically, the inner end portions 44 of the spokes 22 are inserted through one end of the bores 34 of the hub 20, and then the spoke nipples 46 are inserted through the other end of the bores 34. The headed or flanged portion of the spoke nipples 46 engage an internal abutment surface of the bore 34 to fixedly secure inner end portions 34 of the spokes 22 to the hub 20. Accordingly, the spokes 22 can be tightened in a substantially conventional manner between the hub 20 and the rim 24 such that the spokes 22 are placed under tension. In other words, when the spokes 22 are placed under tension, the spokes 22 apply a radially inwardly directed force on the rim 24 at various points on the rim 24. These tension forces of the spokes 22 cause the rim 24 to deform inwardly at the points where the spokes 22 are coupled to the rim 24 as discussed below.

Figure 7:
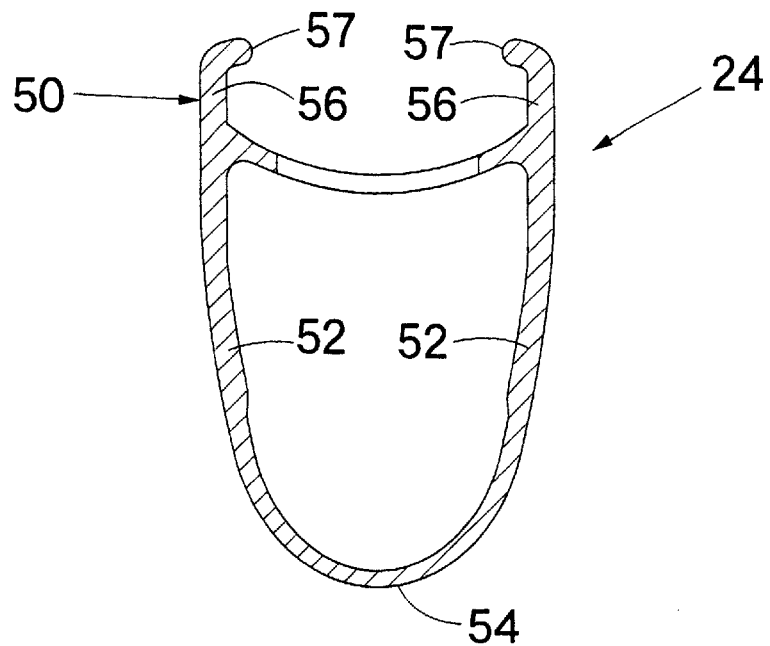
FIG. 7 is a partial, enlarged cross sectional view of the bicycle rim illustrated in FIGS. 1–6 in accordance with the present invention as seen along section line 7—7 of FIG. 5.

Referring now to FIGS. 5, 7 and 8, the rim 24 is a so-called deep rim in which the rim's radial height is greater than the rim's radial width. Of course, it will be apparent to those skilled in the art from this disclosure that other types of rims can be utilized in connection with the present invention without departing from the scope of the present invention. The rim 24 is designed to secure the tire 26 thereto in a conventional manner. In particular, in this embodiment, the rim 24 is a "clinchers" type of rim. It will be apparent to those skilled in the art from this disclosure that the rim can be a "tubular" type of rim in which the tire 26 is fastened thereto by rim cement. In other words, the rim 24 can have other shapes to accommodate other types of tire arrangements as needed and/or desired without departing from the scope of the present invention.

As seen in FIG. 5, the rim 24 has a substantially octagonal shape. It should be noted that this substantially octagonal shape is exaggerated in FIG. 5 for the purposes of illustration. Of course, the precise shape of the outer periphery of the rim 24 will depend upon the number of spokes 22 being utilized and/or their arrangements. In this embodiment, there are eight pairs of spokes 22 such that tension from the spokes 22 is concentrated at eight points on the rim 24. Thus, the rim 24 can be divided into sixteen rim areas or sections 24a and 24b. More specifically, the rim 24 has eight spoke attachment areas 24a and eight non-spoke attachment areas 24b that are located between the spoke attachment areas 24a. The outer peripheral edges of the spoke attachment areas 24a have a first radii $R_1$ extending from the center axis A of the rim 24, while the outer peripheral edges of the non-spoke attachment areas 24b have second radii $R_2$ extending from the center axis of the rim. The first radii $R_1$ of the spoke attachment areas 24a are larger than the second radii $R_2$ of the non-spoke attachment areas 24b, since the tension from the spokes 22 deforms the spoke attachment areas 24a in a generally radially inward direction. Thus, the tension of the spokes 22 deforms the rim 24 such that the spoke attachment areas 24a move radially inwardly so that the radii of the spoke attachment areas 24a substantially match the non-spoke attachment areas 24b as compared to a round conventional rim that has a circular outer peripheral edge prior to deformation by the tension of the spokes. For example, a round conventional rim (circular prior to assembly) will typical have the radii of the rim varying in length from about 0.4 mm to about 0.6 mm depending on the tension in the spokes. In the rim 24 of the present invention, the radii of the rim 24 will only vary about 16 mm in length to produce a more round wheel.

In this preferred embodiment, the spoke attachment areas 24a extend for approximately 20°, while the non-spoke attachment areas 24b extend along an arc of approximately 25°. While the non- spoke attachment areas 24b are shown as relatively straight tubular sections, it will be apparent to those skilled in the art from this disclosure that the non-spoke attachment portions can be slightly curved. In any event, the rim 24 is constructed such that its outer periphery has a non-circular outer periphery arranged about the center axis A of the rim 24 such that by tightening the spokes 22 the rim 24 is deformed inwardly in a generally radial direction to become more circular. More specifically, the tightening of the spokes 22 results in the rim 24 having first radii $R_1$ at the spoke attachment areas 24a that are larger than second radii $R_2$ at the non-spoke attachment areas 24b. In other words, the spoke attachment areas 24a are areas of high deformation, while the non-spoke attachment areas 24b are areas of low deformation. In contrast, a conventional rim is initially substantially circular, and thus, the spoke attachment areas will be deformed inwardly in a generally radial direction to become less circular. In other words, in a conventional rim, the spoke attachment areas have smaller radii than the radii of the non-spoke attachment areas.

Referring again to FIGS. 7 and 8, the rim 24 is an annular member that has an outer annular outer tire attachment portion 50, a pair of annular spoke attachment or side portions 52 and an inner annular portion 54. The outer annular portion 50 extends between the annular spoke attachment portions 52 and is adapted to receive a pneumatic tire 26 thereon. The general shape of the cross-sectional profile of the rim is illustrated and discussed in U.S. Pat. No. 6,283,557, issued on Sep. 4, 2001 and assigned to Shimano, Inc. Thus, the cross-sectional profile of the rim 24 will not be discussed and/or illustrated in detail herein.

Preferably, the outer annular portion 50 of the rim 24 has a substantially "U-shaped" cross-section adapted to receive a clincher type pneumatic tire 26. The outer annular portion 50 of the rim includes first and second clincher attachment flanges 56 with first and second annular beads 57. The outer peripheral edges of the beads 57 define the outer peripheral edges of the rim 24. The inner radially facing surfaces of the beads 57 have an annular contour that is identical to the outer peripheral edge of the rim 24, except that the inner radially facing surfaces of the beads 57 have smaller radii than the outer peripheral edges of the rim 24.

The rim 24 is preferably constructed utilizing conventional manufacturing techniques for producing bicycle rims. More specifically, the rim 24 of the illustrated embodiment is initially formed as an extruded tube that is shaped to form a somewhat octagon shape as seen in FIG. 5. The ends of the tube are welded together along a weld or seam 53 to form a continuous annular, tubular member.

In this embodiment, the annular spoke attachment portions 52 face in substantially opposite axial directions, and include a plurality of spoke openings 58. In this illustrated embodiment, eight spoke openings 58 are formed on each of the annular spoke attachment portions 52 to form first and second sets of spoke openings 58. More specifically, the first spoke openings 58 on the first annular spoke attachment portions 52 are equally space apart in the circumferential direction. Likewise, the second spoke openings 58 on the second annular spoke attachment portion 52 are evenly spaced apart in the circumferential direction. In this embodiment, the first spoke openings 58 are circumferentially offset by a few degrees from the second spoke openings 58. Thus, the spoke openings 58 are located in the spoke attachment areas 24a of the rim 24.

Figure 9:
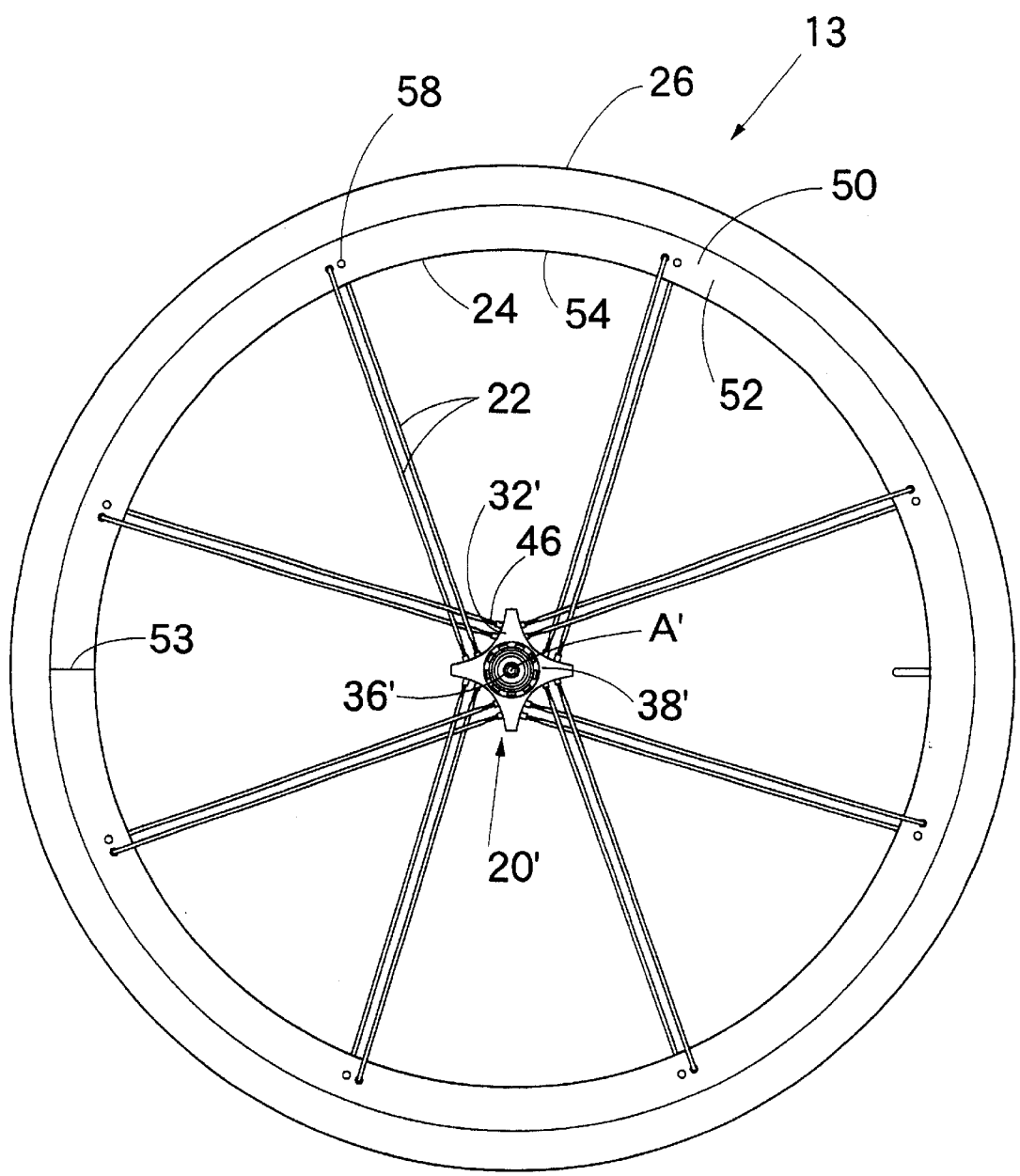
FIG. 9 is a side elevational view of the rear bicycle wheel illustrated in FIG. 1 in accordance with the present invention.
Figure 10:
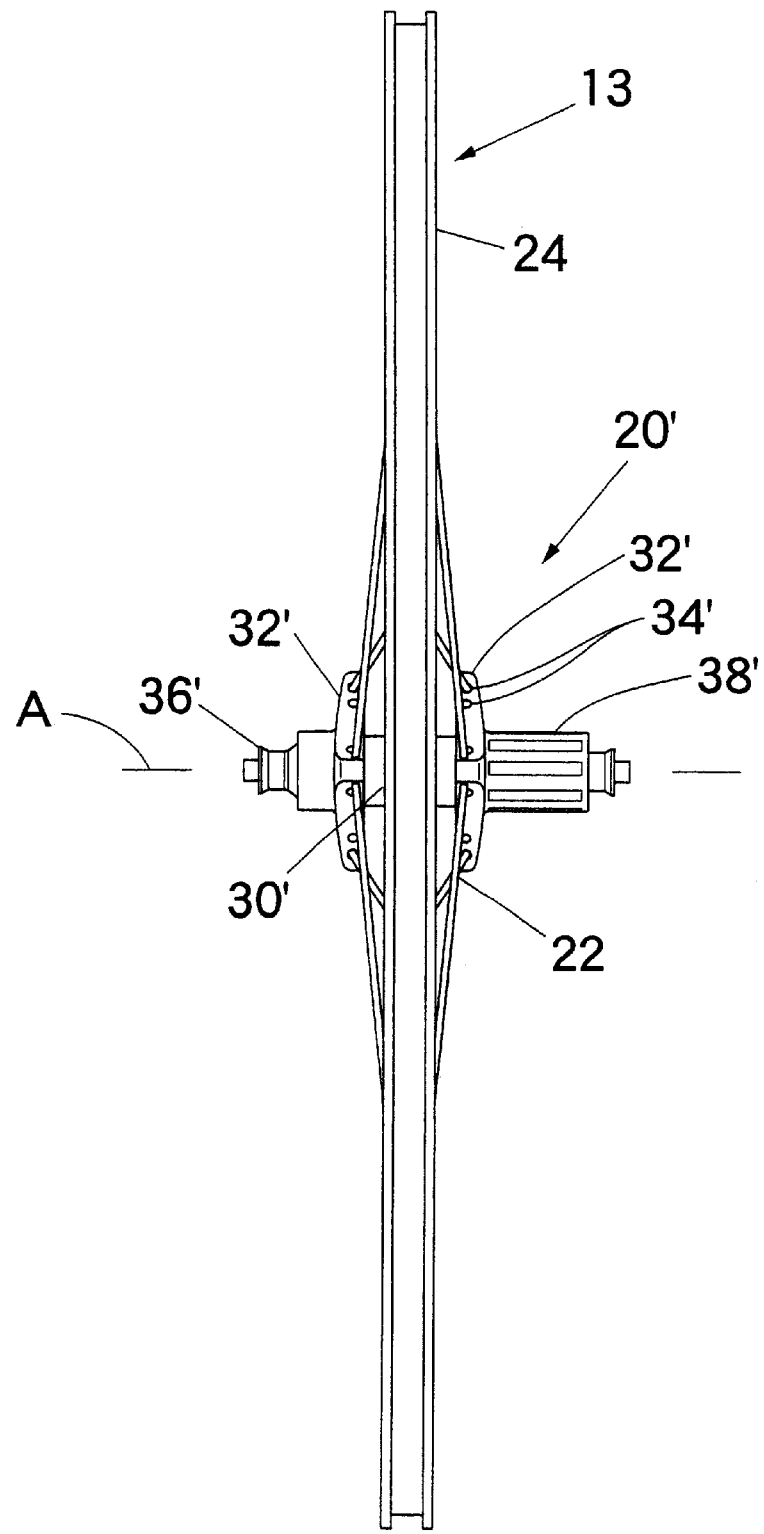
FIG. 10 is an edge elevational view of the rear bicycle wheel with the bicycle rim illustrated in FIGS. 1 and 9 in accordance with the present invention.
Figure 11:
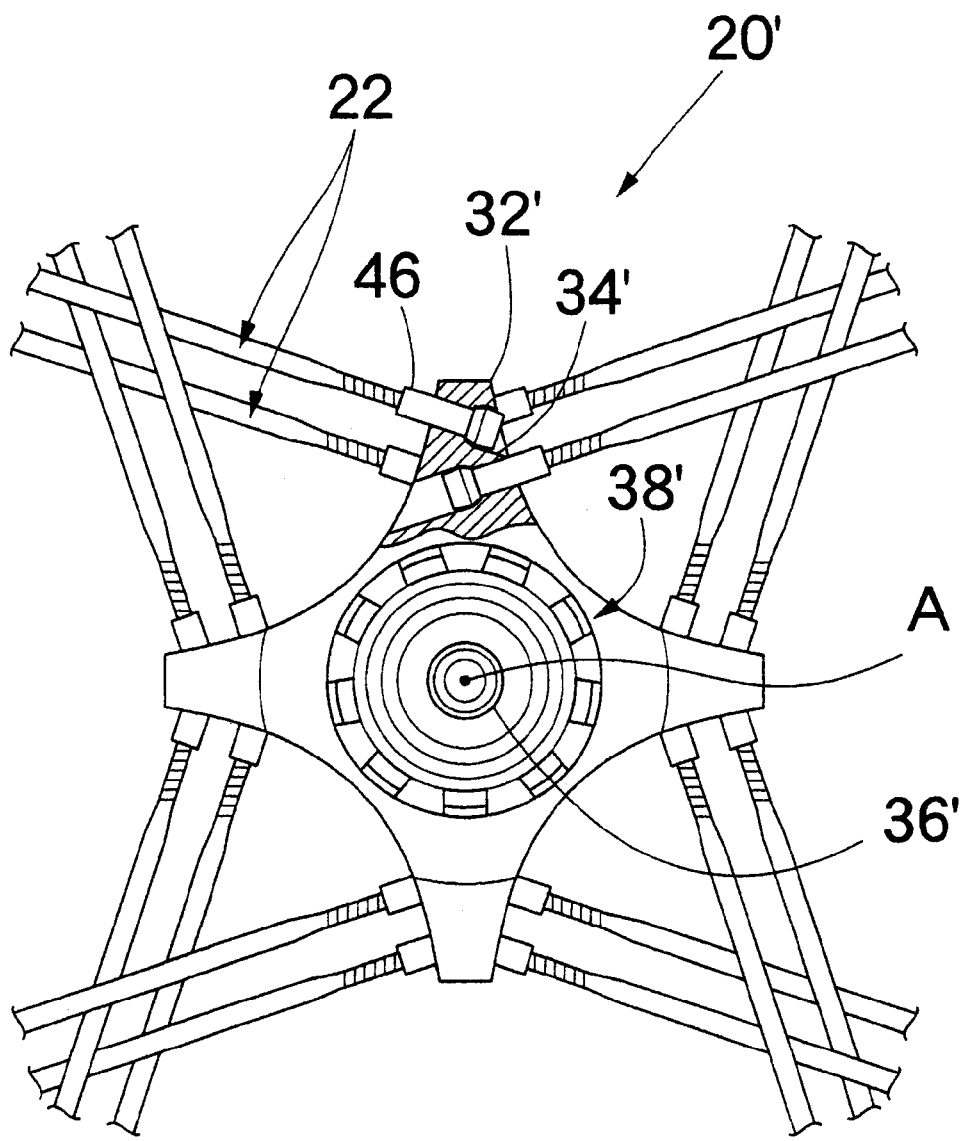
FIG. 11 is an enlarged, partial side elevational view of the bicycle hub assembly used with the bicycle rim illustrated in FIGS. 1, 9 and 10 in accordance with the present invention, with a portion of the hub body broken away for purposes of illustration.

Turning now to FIGS. 9–11, the rear wheel 13 is basically identical to the front wheel 12, except for the rear bicycle hub 20'. Thus, the parts of the rear wheel 13 that are identical to the parts of the front wheel 12 will be given the same reference numerals as the parts of front wheel 12. In other words, the rear wheel 13 includes the identical rim 24 as the front wheel 12 with sixteen spokes 22 extending generally in a radial direction between the rear hub 20' and the annular rim 24. In view of the similarity between the front and rear wheels 12 and 13, the descriptions of the parts of the rear wheel 13 that are identical to the parts of the front wheel 12 have been omitted for the sake of brevity.

The rear hub 20' is a well known hub in the art. Thus, the rear hub 20' will not be discussed or illustrated in detail herein. Moreover, it will be apparent to those skilled in the art that the construction of the rear hub 20' can be modified from the hub illustrated herein without departing from the scope of the present invention. Moreover, the rear hub 20' is designed to have sixteen tangentially arranged spokes 22. However, it will be apparent to those skilled in the art from this disclosure that the rear hub 20' can be designed for tangential and/or radial spokes with more or fewer spokes as needed and/or desired.

Basically, the rear hub 20' has a tubular body 30' with a pair of end mounting flanges 32' for mounting spokes 22 thereto. Each end flange 32' has four spoke attachment points or members with a pair of spoke holes 34' formed in each of the spoke attachment members for coupling the spokes 22 thereto. The tubular body section 30' rotatably supports an axle 36' therein about a center axis of rotation A by a pair of bearing assemblies (not shown). Each of the spoke holes 34' preferably has a step shaped configuration for attaching the spokes 22 thereto. The axle 36' has a freewheel 38' that supports a sprocket assembly 39' (FIG. 1).

It will be apparent to those skilled in the art from this disclosure that the number and shape of the spoke attachment points of the end flanges 32' will depend on the number of spokes 22 and their shapes. Accordingly, it will be apparent to those skilled in the art from this disclosure that other types and shapes of hubs can be utilized in connection with the present invention.

Second Embodiment

Figure 12:
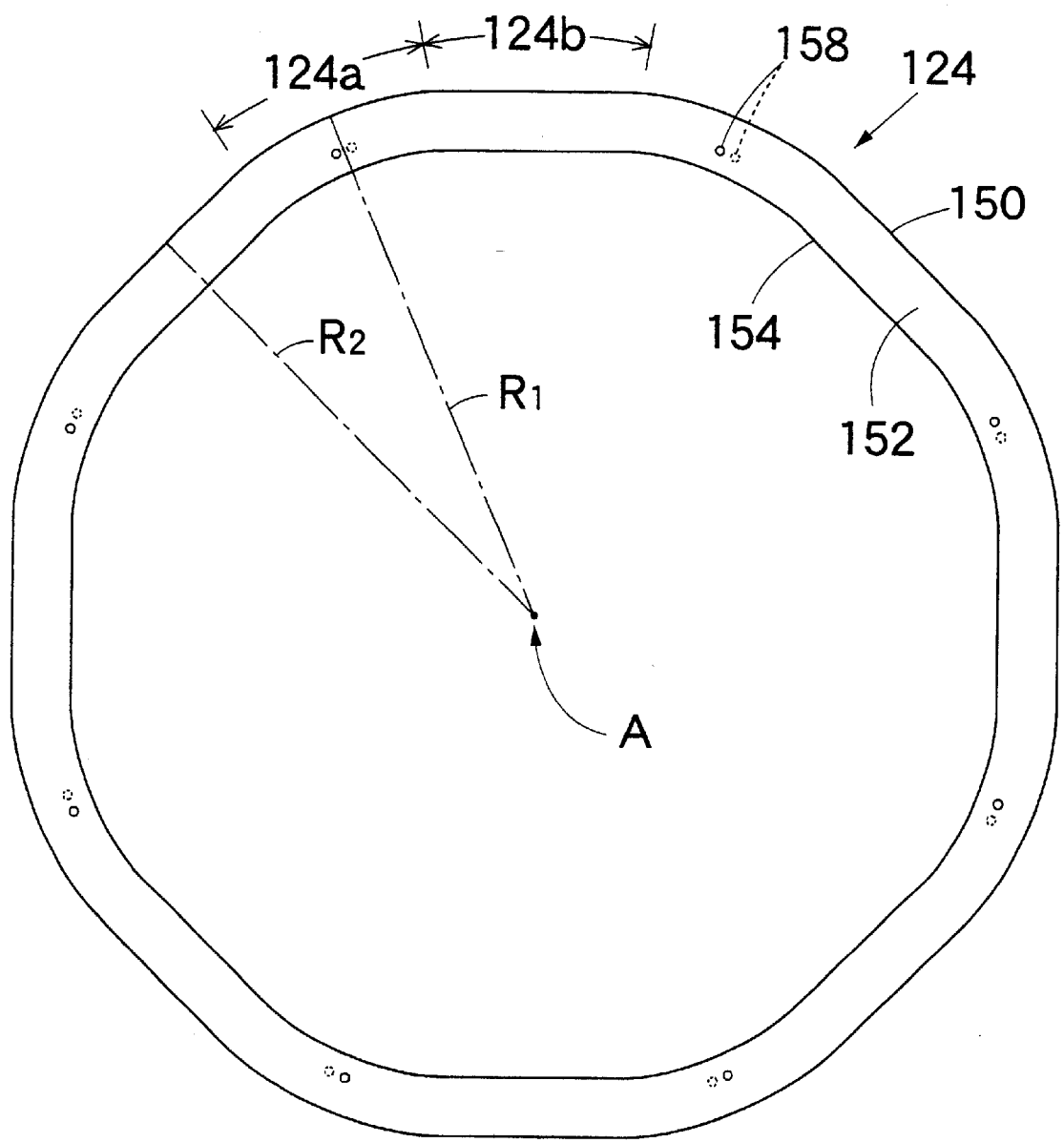
FIG. 12 is an exaggerated side elevational view of a bicycle rim in accordance with a second embodiment of the present invention, prior to the tensioning of the spokes to produces the bicycle wheel with improved the roundness.
Figure 13:
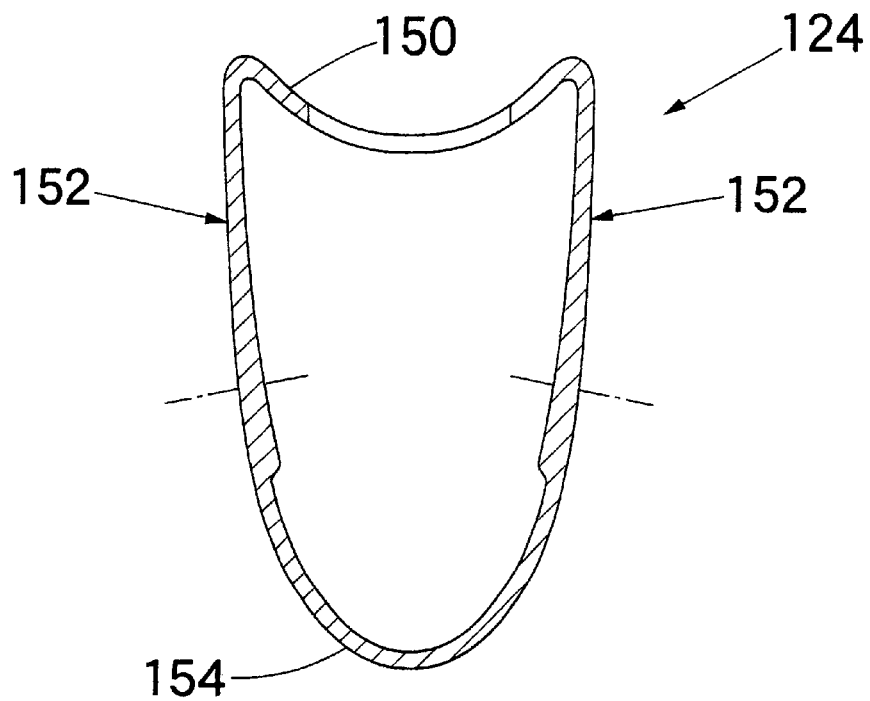
FIG. 13 is an enlarged, partial cross sectional view of the bicycle rim illustrated in FIG. 12 in accordance with the second embodiment of the present invention as seen along section line 13—13 of FIG. 12.
Figure 14:
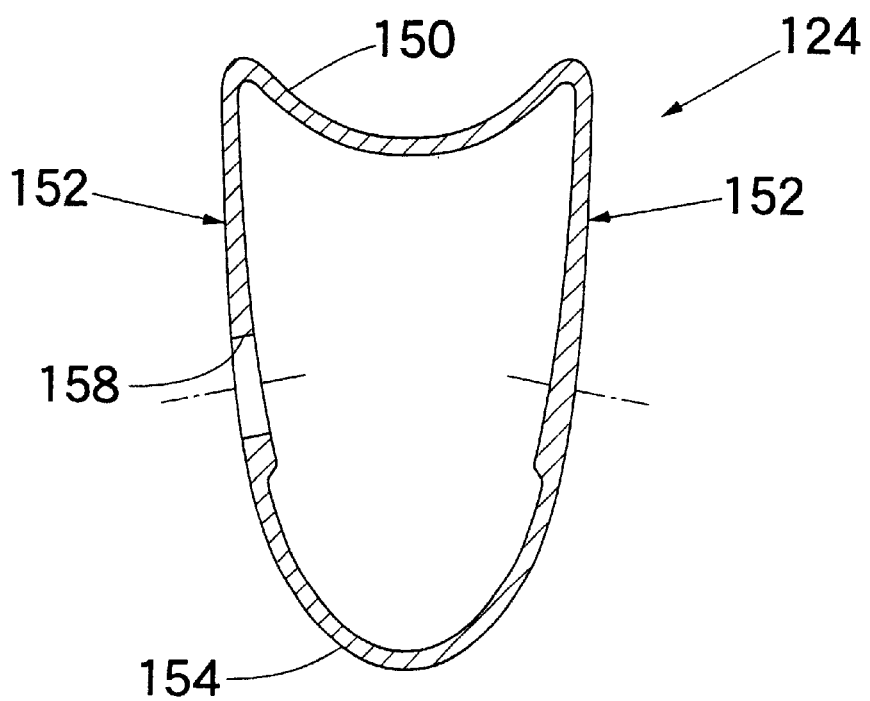
FIG. 14 is an enlarged, partial cross sectional view of the bicycle rim illustrated in FIG. 12 in accordance with the second embodiment of the present invention as seen along section line 14—14 of FIG. 12.

Referring now to FIGS. 12–14, a rim 124 is illustrated in accordance with a second embodiment of the present invention. The rim 124 can be utilized with spokes 22 and either the front hub 20 or the rear hub 20' to form either a front wheel or a rear wheel as needed and/or desired. The rim 124 is a tubular type of rim. The rim 124 is substantially identical to rim 24, discussed above, except that rim 124 does not include clincher attachment flanges. In view of the similarities between the first embodiment and the second embodiment, the second embodiment will not be discussed or illustrated in detail herein. Rather, it will be apparent to those skilled in the art from this disclosure that the description of the first embodiment applies to the description of the second embodiment, except for the attachment of the tire thereto.

As seen in FIG. 12, the rim 124 has a substantially octagonal shape that is the same as the rim 24, discussed above. It should be noted that this substantially octagonal shape is exaggerated in FIG. 12 for the purposes of illustration. Of course, the precise shape of the outer periphery of the rim 124 will depend upon the number of spokes being utilized and/or their arrangements.

In this embodiment, there are eight pairs of spokes such that tension from the spokes is concentrated at eight points on the rim 124, similar to the first embodiment. Thus, the rim 124 can be divided into sixteen rim areas or sections 124a and 124b. More specifically, the rim 124 has eight spoke attachment areas 124a and eight non-spoke attachment areas 124b that are located between the spoke attachment areas 124a. The outer peripheral edges of the spoke attachment areas 124a have a first radii $R_1$ extending from the center axis A of the rim 124, while the outer peripheral edges of the non-spoke attachment areas 124b have second radii $R_2$ extending from the center axis of the rim 124. The first radii $R_1$ of the spoke attachment areas 124a are larger than the second radii $R_2$ of the non-spoke attachment areas 124b, since the tension from the spokes 122 deforms the spoke attachment areas 124a inwardly in a generally radially direction. Thus, the tension of the spokes deforms the rim 124 such that the spoke attachment areas 124a move radially inwardly so that the radii of the spoke attachment areas 124a substantially match the non-spoke attachment areas 124b as compared to a conventional rim that has a circular outer peripheral edge prior to deformation by the tension of the spokes. In any event, the rim 124 is constructed such that its outer periphery has a non-circular outer periphery arranged about the center axis A of the rim 124 such that by tightening the spokes the rim 124 is deformed inwardly in a generally radial direction to become more circular. More specifically, the tightening of the spokes results in the rim 124 having first radii $R_1$ at the spoke attachment areas 124a that are larger than second radii $R_2$ at the non-spoke attachment areas 124b. In other words, the spoke attachment areas 124a are areas of high deformation, while the non-spoke attachment areas 124b are areas of low deformation. In contrast, a conventional rim is initially substantially circular, and thus, the spoke attachment areas will be deformed inwardly in a generally radial direction to become less circular. In other words, in a conventional rim, the spoke attachment areas have smaller radii than the radii of the non-spoke attachment areas.

Referring to FIGS. 13 and 14, the rim 124 is an annular member that has an outer annular outer tire attachment portion 150, a pair of annular spoke attachment or side portions 152 and an inner annular portion 154. The outer annular portion 150 is adapted to receive a pneumatic tire thereon. The general shape of the cross-sectional profile of the rim is illustrated and discussed in U.S. Pat. No. 6,234,580, issued on May 22, 2001 and assigned to Shimano, Inc. Thus, the cross-sectional profile of the rim 124 will not be discussed and/or illustrated in detail herein. Preferably, the outer annular portion 150 of the rim 124 portion is an axially curved tire cementing surface as viewed in cross section that is adapted to receive a pneumatic tire. The outer peripheral edges of the annular spoke attachment portions 152 define the outer peripheral edges of the rim 124. The outer annular portion 150 and the annular spoke attachment portions 152 have an annular contour that is identical to the outer peripheral edge of the rim 24, except that the outer annular portion 150 has smaller radii than the outer peripheral edges of the rim 24.

Third Embodiment

Figure 15:
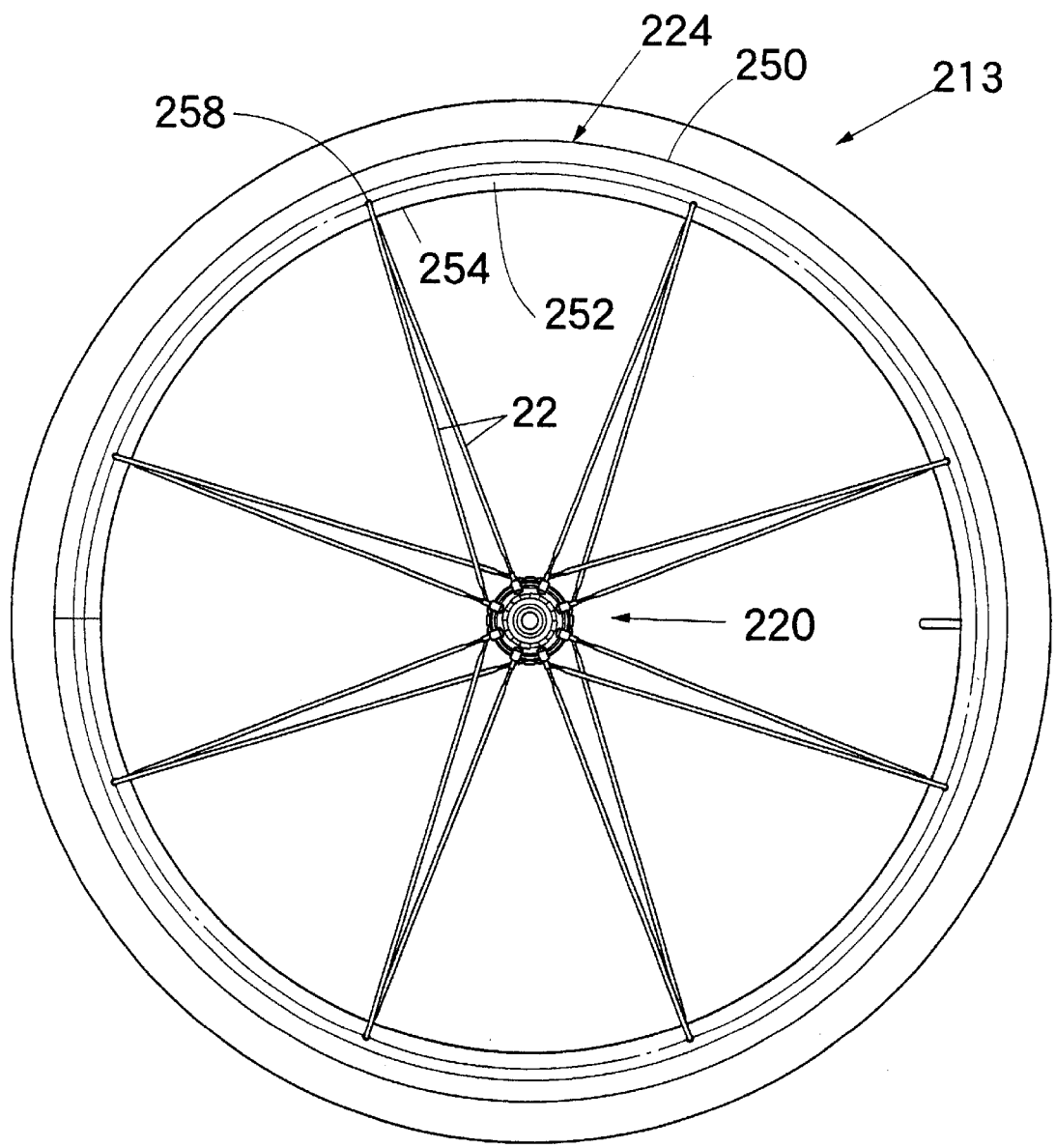
FIG. 15 is a side elevational view of the rear bicycle wheel in accordance with a third embodiment of the present invention.
Figure 16:
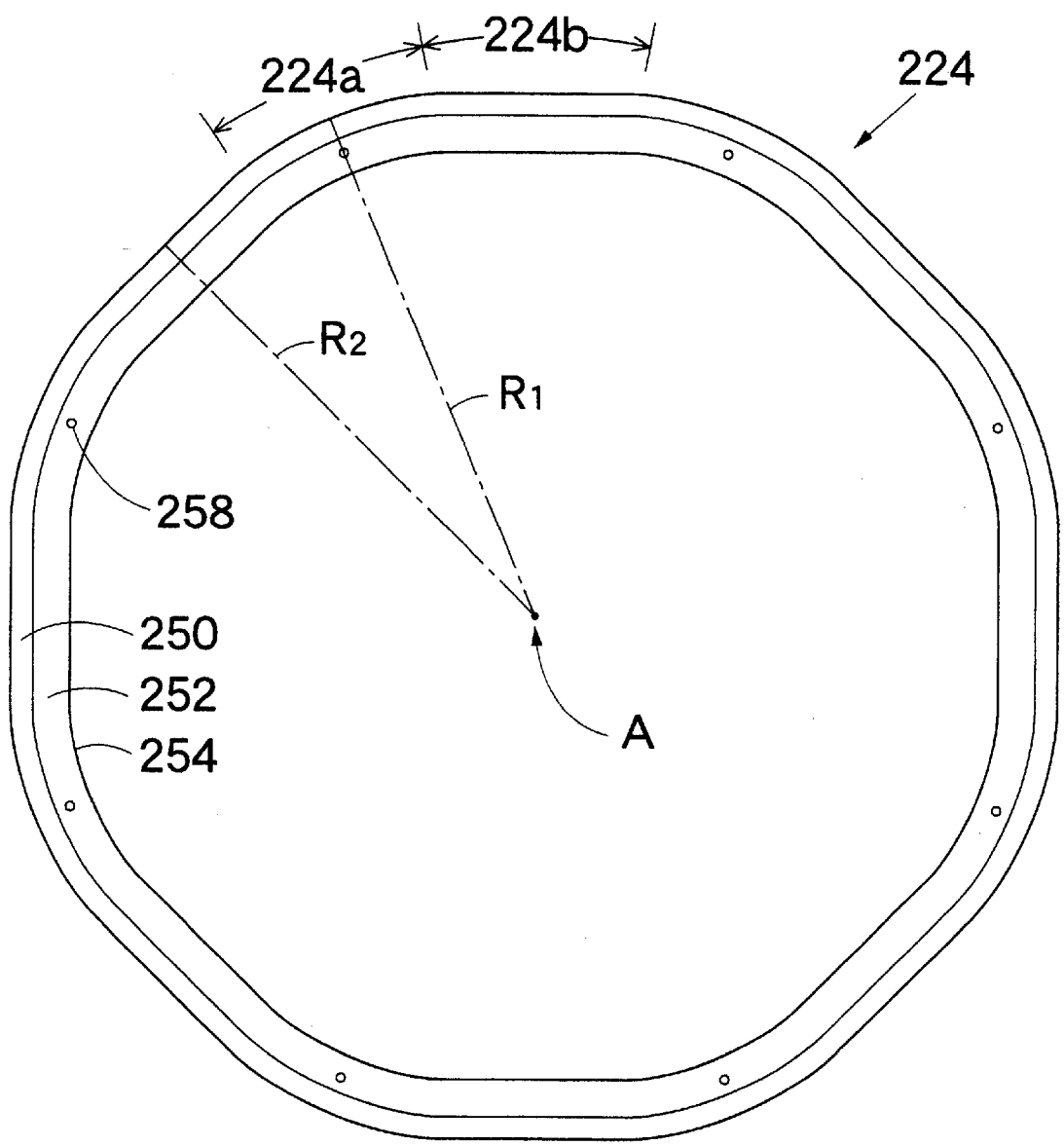
FIG. 16 is an exaggerated side elevational view of the bicycle rim illustrated in FIG. 15 in accordance with the third embodiment of the present invention, prior to the tensioning of the spokes to produces the bicycle wheel with improved the roundness.

Referring now to FIGS. 15 and 16, a rear wheel 213 is illustrated in accordance with a third embodiment of the present invention. In view of the similarities between this third embodiment and the prior embodiments, this third embodiment will not be discussed or illustrated herein. The rear wheel 213 utilizes a rim 224 that has an octagonal shape similar to FIG. 5, prior to placing the spokes 22 under tension to deform the rim 224. Thus, the rim 224 is constructed to deform in the same manner as the first embodiment. However, the spoking arrangement of the rear wheel 213 has been changed to have radially arranged spokes on the freewheel side of the hub 220 and tangential spokes on the opposite (non-freewheel) side of the hub 220. Thus, the rim 224 is identical to the rim 24, discussed above, except that the spacing of the spoke holes 258 have been changed to accommodate the different spoking arrangement. Specifically, the first and second sets of spoke openings 258 are axially aligned in the rear wheel 213. In other words, the first and second spoke openings 258 on the opposite sides of the spoke attachment portions 252 are coincident. As seen in FIG. 16, the rim 224 has an octagonal shape similar to the first and second embodiment, prior to assembly. The cross-sectional profile of the rim 224 has the same profile as the first embodiment. Of course, the rim 224 can have the same profile as the second embodiment as needed and/or desired.

Moreover, while the rim 224 is designed to have sixteen tension spokes 22. However, it will be apparent to those skilled in the art from this disclosure that the rim 224 can be designed with more or fewer spokes as needed and/or desired. Also the rear wheel 213 can be designed with radially arranged spokes on the non-freewheel side of the hub 220 and tangential spokes the freewheel side of the hub 220.

In this embodiment, there are eight pairs of spokes such that tension from the spokes is concentrated at eight points on the rim 224, similar to the first embodiment. Thus, the rim 224 can be divided into sixteen rim areas or sections 224a and 224b. More specifically, the rim 214 has eight spoke attachment areas 224a and eight non-spoke attachment areas 224b that are located between the spoke attachment areas 224a. The outer peripheral edges of the spoke attachment areas 224a have a first radii $R_1$ extending from the center axis A of the rim 224, while the outer peripheral edges of the non-spoke attachment areas 224b have second radii $R_2$ extending from the center axis of the rim 224. The first radii $R_1$ of the spoke attachment areas 224a are larger than the second radii $R_2$ of the non-spoke attachment areas 224b, since the tension from the spokes 222 deforms the spoke attachment areas 224a inwardly in a generally radially direction. Thus, the tension of the spokes deforms the rim 224 such that the spoke attachment areas 224a move radially inwardly so that the radii of the spoke attachment areas 224a substantially match the non-spoke attachment areas 224b as compared to a conventional rim that has a circular outer peripheral edge prior to deformation by the tension of the spokes. In any event, the rim 224 is constructed such that its outer periphery has a non-circular outer periphery arranged about the center axis A of the rim 224 such that by tightening the spokes the rim 224 is deformed inwardly in a generally radial direction to become more circular. More specifically, the tightening of the spokes results in the rim 224 having first radii $R_1$ at the spoke attachment areas 224a that are larger than second radii $R_2$ at the non-spoke attachment areas 224b. In other words, the spoke attachment areas 224a are areas of high deformation, while the non-spoke attachment areas 224b are areas of low deformation. In contrast, a conventional rim is initially substantially circular, and thus, the spoke attachment areas will be deformed inwardly in a generally radial direction to become less circular. In other words, in a conventional rim, the spoke attachment areas have smaller radii than the radii of the non-spoke attachment areas.

Fourth Embodiment

Figure 17:
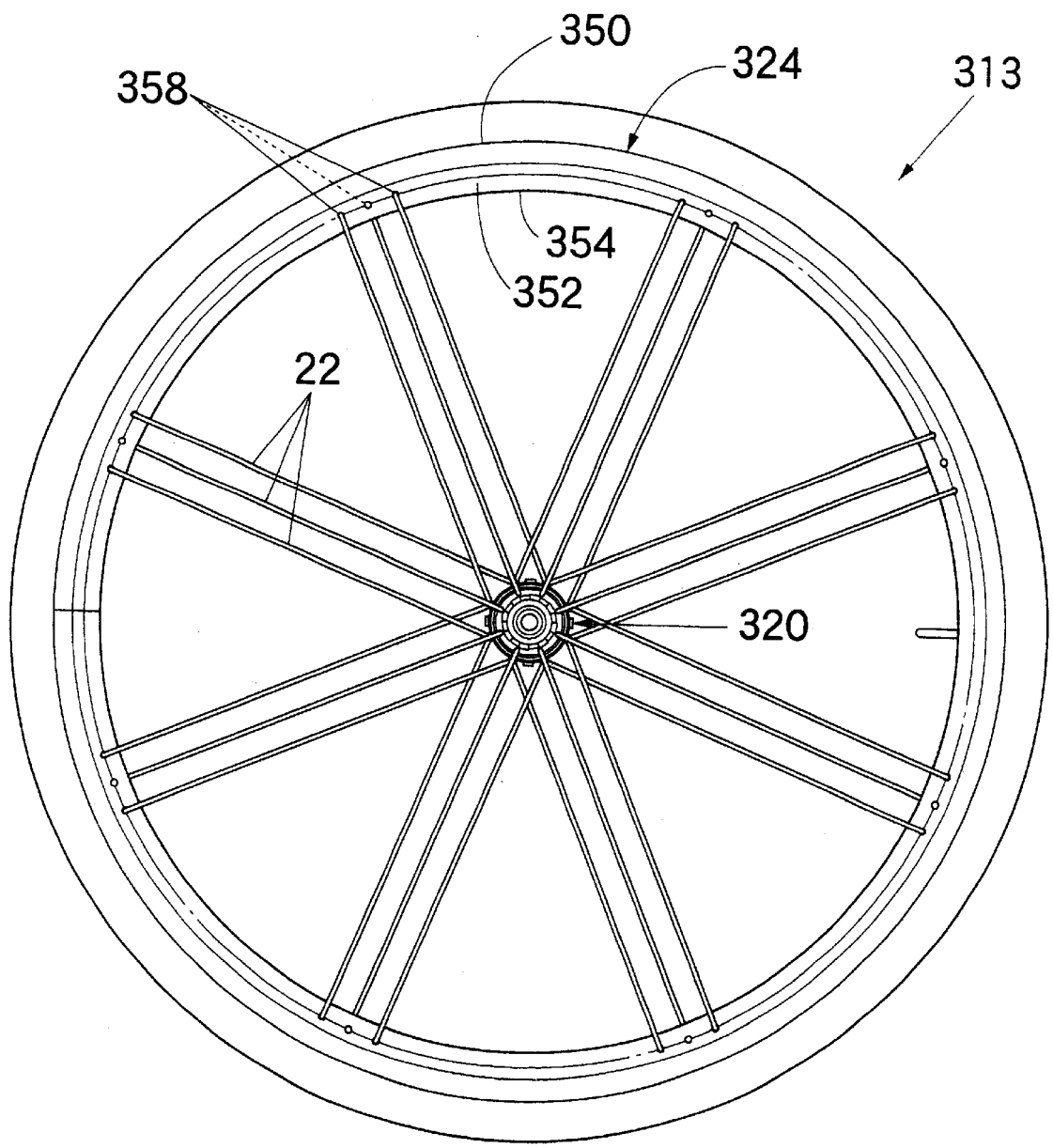
FIG. 17 is a side elevational view of the rear bicycle wheel in accordance with a fourth embodiment of the present invention.
Figure 18:
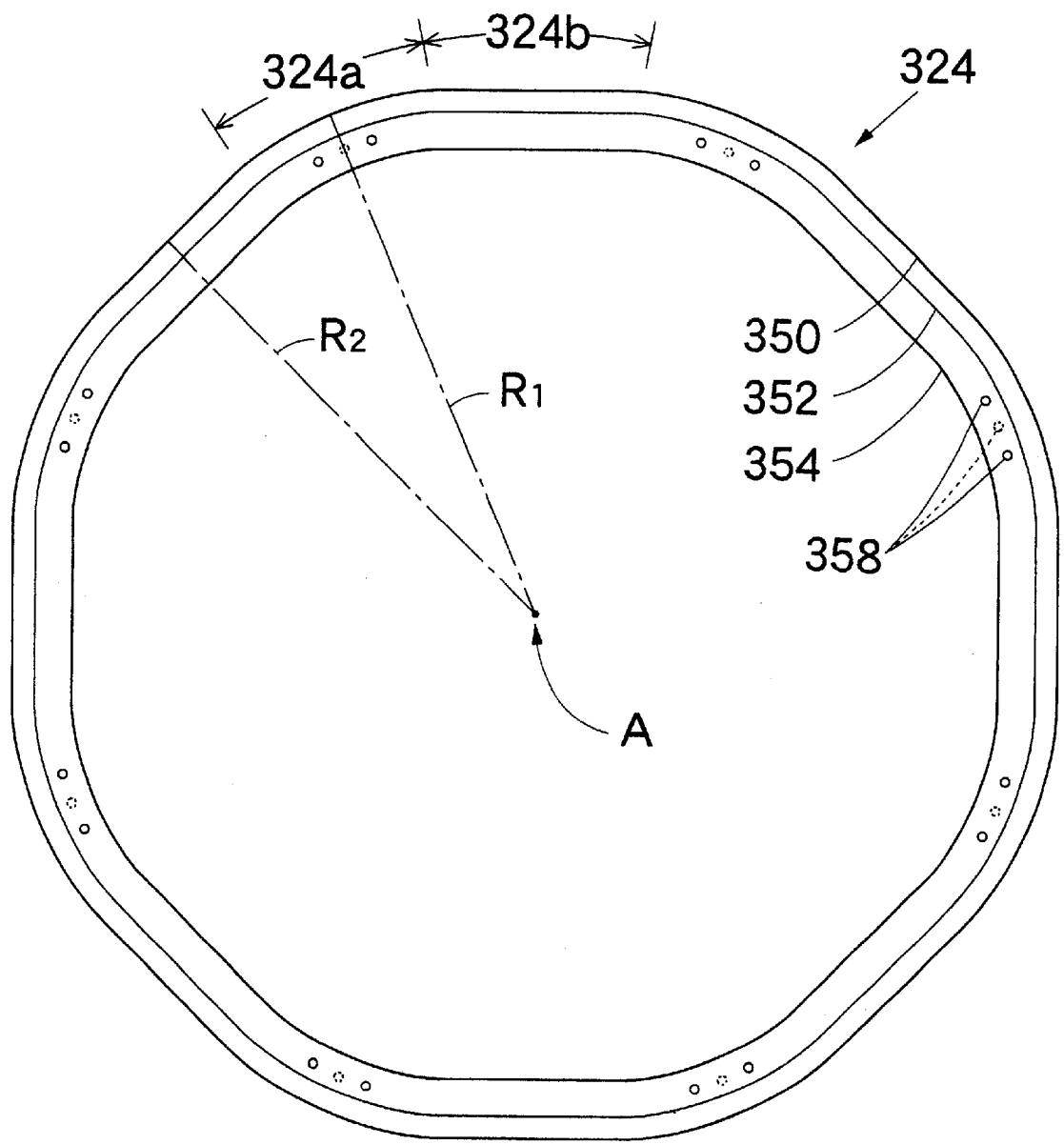
FIG. 18 is an exaggerated side elevational view of the bicycle rim illustrated in FIG. 17 in accordance with the fourth embodiment of the present invention, prior to the tensioning of the spokes to produces the bicycle wheel with improved the roundness.

Referring now to FIGS. 17 and 18, a rear wheel 313 is illustrated in accordance with a fourth embodiment of the present invention. In view of the similarities between this fourth embodiment and the prior embodiments, this fourth embodiment will not be discussed or illustrated herein.

The rear wheel 313 utilizes a rim 324 that has an octagonal shape similar to FIG. 5, prior to placing the spokes 22 under tension to deform the rim 324. Thus, the rim 324 is constructed to deform in the same manner as the first embodiment. However, the spoking arrangement of the rear wheel 313 has been changed to have radially arranged spokes on the freewheel side of the hub 320 and tangential spokes on the opposite (non-freewheel) side of the hub 320. Thus, the rim 324 is identical to the rim 24, discussed above, except that the spacing of the spoke holes 358 have been changed to accommodate the different spoking arrangement. Specifically, the first and second sets of spoke openings 358 are arranged in groupings of three in the rear wheel 313. As seen in FIG. 18, the rim 324 has an octagonal shape similar to the first and second embodiment, prior to assembly. The cross-sectional profile of the rim 324 has the same profile as the first embodiment. Of course, the rim 324 can have the same profile as the second embodiment as needed and/or desired.

Moreover, while the rim 324 is designed to have twenty-four tension spokes 22. However, it will be apparent to those skilled in the art from this disclosure that the rim 324 can be designed with more or fewer spokes as needed and/or desired. Also the rear wheel 313 can be designed with radially arranged spokes on the non-freewheel side of the hub 320 and tangential spokes the freewheel side of the hub 320.

In this embodiment, there are eight groupings of three spokes such that tension from the spokes is concentrated at eight points on the rim 324, similar to the first embodiment. Thus, the rim 324 can be divided into sixteen rim areas or sections 324a and 324b. More specifically, the rim 324 has eight spoke attachment areas 324a and eight non-spoke attachment areas 324b that are located between the spoke attachment areas 324a. The outer peripheral edges of the spoke attachment areas 324a have a first radii $R_1$ extending from the center axis A of the rim 324, while the outer peripheral edges of the non-spoke attachment areas 324b have second radii $R_2$ extending from the center axis of the rim 324. The first radii $R_1$ of the spoke attachment areas 324a are larger than the second radii $R_2$ of the non-spoke attachment areas 324b, since the tension from the spokes 322 deforms the spoke attachment areas 24a inwardly in a generally radially direction. Thus, the tension of the spokes deforms the rim 324 such that the spoke attachment areas 324a move radially inwardly so that the radii of the spoke attachment areas 324a substantially match the non-spoke attachment areas 324b as compared to a conventional rim that has a circular outer peripheral edge prior to deformation by the tension of the spokes. In any event, the rim 24 is constructed such that its outer periphery has a non-circular outer periphery arranged about the center axis A of the rim 324 such that by tightening the spokes the rim 324 is deformed inwardly in a generally radial direction to become more circular. More specifically, the tightening of the spokes results in the rim 324 having first radii $R_1$ at the spoke attachment areas 324a that are larger than second radii $R_2$ at the non-spoke attachment areas 324b. In other words, the spoke attachment areas 324a are areas of high deformation, while the non-spoke attachment areas 324b are areas of low deformation. In contrast, a conventional rim is initially substantially circular, and thus, the spoke attachment areas will be deformed inwardly in a generally radial direction to become less circular. In other words, in a conventional rim, the spoke attachment areas have smaller radii than the radii of the non-spoke attachment areas.

The terms of degree such as "substantially", "generally", "about" and "approximately" as used herein mean a reasonable amount of deviation of the modified term such that the end result is not significantly changed. These terms should be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing description of the embodiments according to the present invention are provided for illustration only, and not for the purpose of limiting the invention as defined by the appended claims and their equivalents.

What is claimed is:

1. A bicycle rim comprising:

first and second annular side portions;

an inner annular portion disposed radially inwardly of said first and second annular side portions and disposed axially between said first and second annular side portions;

an outer annular tire attachment portion disposed axially between said first and second annular side portions, and said outer annular tire attachment portion having non-circular outer peripheral edges arranged about a center axis of said rim; and at least one of said inner annular portion and said first and second annular side portions including a plurality of circumferentially spaced spoke openings, said non-circular outer peripheral edges having first radii extending from said center axis of said rim and passing through said spoke openings that are larger than second radii of said non-circular outer peripheral edges passing midway between selected circumferentially adjacent pairs of said spoke openings.

2. The bicycle rim according to claim 1, wherein said spoke openings are no more than twenty eight in total.

3. The bicycle rim according to claim 1, wherein said spoke openings are sixteen in total.

4. The bicycle rim according to claim 1, wherein a hollow interior is formed by said first and second annular side portions, said inner annular portion, and said outer annular tire attachment portion.

5. The bicycle rim according to claim 4, wherein a first set of said spoke openings is formed in said first annular side portion and a second set of said spoke openings is formed in said second annular side portion.

6. The bicycle rim according to claim 5, wherein said first set of said spoke openings is equal in number to said second set of said spoke openings.

7. The bicycle rim according to claim 6, wherein said first set of said spoke openings is circumferentially spaced substantially evenly around said rim and said second set of said spoke openings is circumferentially spaced substantially evenly around said rim, with said second set of said spoke openings being disposed substantially adjacent with one of said first set of said spoke openings when viewed along said center axis of said rim.

8. The bicycle rim according to claim 5, wherein said outer annular tire attachment portion includes a first clincher attachment flange with a first annular bead and a second clincher attachment flange with a second annular bead.

9. The bicycle rim according to claim 8, wherein said spoke openings are no more than twenty eight in total.

10. The bicycle rim according to claim 8, wherein said spoke openings are sixteen in total.

11. The bicycle rim according to claim 8, wherein said first set of said spoke openings is equal in number to said second set of said spoke openings.

12. The bicycle rim according to claim 11, wherein said first set of said spoke openings is circumferentially spaced substantially evenly around said rim and said second set of said spoke openings is circumferentially spaced substantially evenly around said rim, with said second set of said spoke openings being disposed substantially adjacent with one of said first set of said spoke openings when viewed along said center axis of said rim.

13. The bicycle rim according to claim 5, wherein said outer annular tire attachment portion is an axially curved tire cementing surface.

14. The bicycle rim according to claim 13, wherein said spoke openings are no more than twenty eight in total.

15. The bicycle rim according to claim 13, wherein said spoke openings are sixteen in total.

16. The bicycle rim according to claim 13, wherein said first set of said spoke openings are equal in number to said second set of said spoke openings.

17. The bicycle rim according to claim 16, wherein said first set of said spoke openings are circumferentially spaced substantially evenly around said rim and said second set of said spoke openings are circumferentially spaced substantially evenly around said rim, with said second set of said spoke openings being disposed substantially adjacent with one of said first set of said spoke openings when viewed along said center axis of said rim.

18. The bicycle rim according to claim 5, wherein said first set of said spoke openings includes twice as many of said spoke openings as said second set of said spoke openings with said first set of said spoke openings being arranged in pairs that are circumferentially spaced substantially evenly around said rim and one of said spoke openings of said second set of said spoke openings is located adjacent one of said pairs of said second set of said spoke openings.

19. The bicycle rim according to claim 1, wherein said outer annular tire attachment portion includes a first clincher attachment flange with a first annular bead and a second clincher attachment flange with a second annular bead.

20. The bicycle rim according to claim 1, wherein said outer annular tire attachment portion is an axially curved tire cementing surface.

21. A method of forming a bicycle wheel comprising the steps of:
    forming a non-circular bicycle rim having a non-circular outer periphery arranged about a center axis of said rim;
    attaching a bicycle hub to said non-circular bicycle rim by a plurality of tension spokes; and
    tightening said tension spokes to place said tension spokes under tension and deform said rim inwardly in a generally radial direction to become more circular.

22. The method according to claim 21, wherein said tightening said tension spokes results in said rim having first radii at first rim areas of high deformation by said tension spokes and second radii at second rim areas of low deformation located between selected circumferentially adjacent pairs of said tension spokes, said first radii of said first rim areas being are larger than said second radii of said second rim areas.

* * * * *

UNITED STATES PATENT AND TRADEMARK OFFICE
CERTIFICATE OF CORRECTION

PATENT NO. : 6,588,853 B2
DATED : July 8, 2003
INVENTOR(S) : Shinpei Okajima

It is certified that error appears in the above-identified patent and that said Letters Patent is hereby corrected as shown below:

<u>Title page,</u>
Item [57], ABSTRACT, please delete the ABSTRACT and replace with the following:
-- A bicycle rim includes first and second annular side portions with an inner annular portion extending between the side portions and an outer annular tire attachment portion extending between the side portions. The outer annular tire attachment portion has non-circular outer peripheral edges arranged about a center axis of the rim. At least one of the inner annular portion and the first and second annular side portions including a plurality of circumferentially spaced spoke openings. The non-circular outer peripheral edges has first radii extending from the center axis of the rim and passing through the spoke openings that are larger than second radii of the non-circular outer peripheral edges passing midway between selected circumferentially adjacent pairs of the spoke openings. --

<u>Column 14,</u>
Line 9, "second" should be -- first --.

Signed and Sealed this

Fourteenth Day of June, 2005

JON W. DUDAS
*Director of the United States Patent and Trademark Office*